US 8,839,191 B2

(12) United States Patent
Ota et al.

(10) Patent No.: US 8,839,191 B2
(45) Date of Patent: Sep. 16, 2014

(54) COMPUTER-READABLE RECORDING MEDIUM, COMPILER, EXECUTION CONTROL APPARATUS, AND EXECUTION CONTROL METHOD FOR CONVERTING A PROGRAM TO BE CALLED

(75) Inventors: Kenji Ota, Suntou (JP); Tsutomu Enokida, Numazu (JP)

(73) Assignee: Fujitsu Limited, Kawasaki (JP)

( * ) Notice: Subject to any disclaimer, the term of this patent is extended or adjusted under 35 U.S.C. 154(b) by 144 days.

(21) Appl. No.: 13/590,232

(22) Filed: Aug. 21, 2012

(65) Prior Publication Data

US 2013/0086596 A1    Apr. 4, 2013

(30) Foreign Application Priority Data

Sep. 30, 2011    (JP) .................................. 2011-218560

(51) Int. Cl.
*G06F 9/44* (2006.01)

(52) U.S. Cl.
USPC ............................. 717/106; 717/140; 718/106

(58) Field of Classification Search
CPC ................ G06F 8/30; G06F 8/41; G06F 9/52
See application file for complete search history.

(56) References Cited

U.S. PATENT DOCUMENTS

| 5,999,731 | A  | * | 12/1999 | Yellin et al. | ............... | 717/126 |
| 6,247,169 | B1 | * | 6/2001  | DeLong       | ............... | 717/131 |
| 7,389,460 | B1 | * | 6/2008  | Demara       | ............... | 714/733 |
| 7,559,063 | B2 | * | 7/2009  | Kass         | ............... | 718/108 |

FOREIGN PATENT DOCUMENTS

| JP | 59-135551 | 8/1984 |
| JP | 2-079125  | 3/1990 |
| JP | 06-168124 | 6/1994 |

* cited by examiner

*Primary Examiner* — Andy Ho
(74) *Attorney, Agent, or Firm* — Fujitsu Patent Center

(57) ABSTRACT

An input unit of a compiler accepts a second program called by a first program. A converting unit of the compiler converts the accepted second program into a program in which an initialization instruction and a return instruction are additionally written as instructions executed when an error occurs. An execution control unit of an execution controller executes an execution file having the program where the instructions are additionally written by the compiler in cooperation with a predetermined function group. If an error occurs, an error processing unit of the execution controller initializes a resource based on the initialization instruction described in the program in the execution file having the error, and returns to a caller program based on the return instruction.

6 Claims, 10 Drawing Sheets

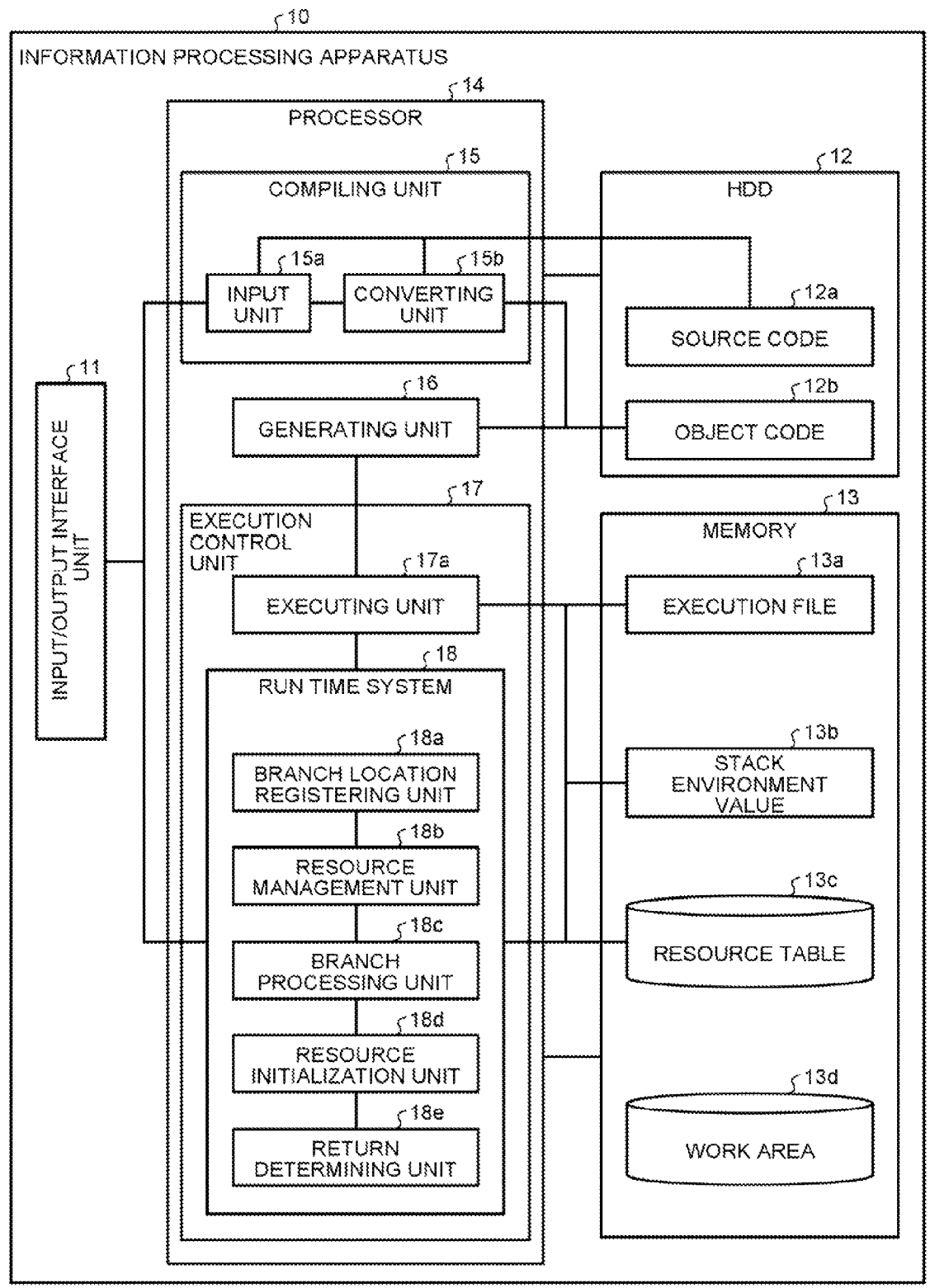

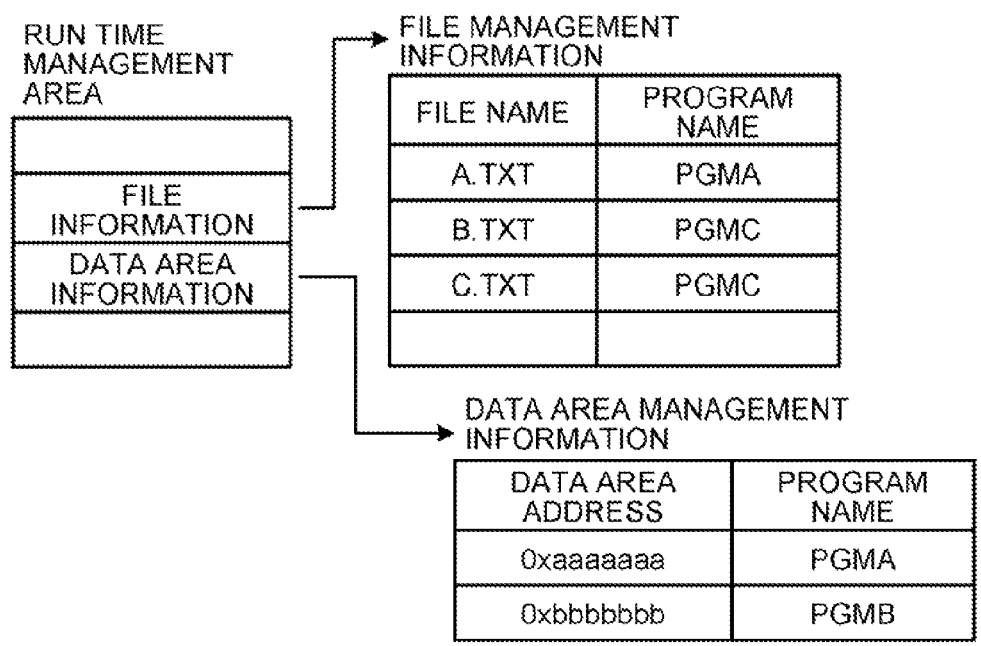

COMPUTER-READABLE RECORDING MEDIUM, COMPILER, EXECUTION CONTROL APPARATUS, AND EXECUTION CONTROL METHOD FOR CONVERTING A PROGRAM TO BE CALLED

CROSS-REFERENCE TO RELATED APPLICATION

This application is based upon and claims the benefit of priority of the prior Japanese Patent Application No. 2011-218560, filed on Sep. 30, 2011, the entire contents of which are incorporated herein by reference.

FIELD

The embodiments discussed herein are directed to a computer-readable recording medium, a compiler, an execution control apparatus, and an execution control method.

BACKGROUND

In these years, in order to meet demands for systems such as an increase in the scale of systems or the complication of client's needs, a large-scale program is used in which other programs are called and run in the program to execute a plurality of programs in cooperation with each other. For an example that programs are caused to cooperate with each other, there is a large-scale program, for instance, in which when a program A is run, a program B is called and run in the program A, and when the program B is run, a program C is called and run in the program B.

There is a known method in which a branch to the high-order program of a caller is described in a called low-order program, and, when an error occurs in the large-scale program mentioned above, control is returned from the low-order program to the high-order program. Such a method is used in COBOL, for example, in which a GOTO statement is used to return control into the program, whereas in the C language, a setjmp function, a longjmp function, or the like is used to return control to a high-order program.

In the case of this method, before returning to a high-order program for rerun, an administrator, an operator, or the like initializes resources such as data and files used in the already executed program. This is performed in order to prevent memory leakage, the duplex open error of a file, or the like.

In a large-scale program including a large number of programs to call a plurality of low-order programs, processing is not sometimes successfully ended when only the high-order program of a program having errors is rerun. In this case, such a method is also performed in which a large-scale program is entirely ended and the large-scale program is rerun from the beginning.

Patent Literature 1: Japanese Laid-open Patent Publication No. 02-079125
Patent Literature 2: Japanese Laid-open Patent Publication No. 59-135551
Patent Literature 3: Japanese Laid-open Patent Publication No. 06-168124.

However, in the conventional art, a problem arises in that it takes time to start rerunning a program having an error.

For example, in the method that control is returned to a high-order program, an administrator or the like generates and runs a different program to initialize resources before rerunning a program having an error. In the case where programs are run in cooperation with each other, the update history of data is identified as well as it is identified which timing a file has been opened, and then a program to initialize resources is generated and run. Consequently, it takes time to make preparation before rerunning a program having an error.

In the method in which a program is rerun from the beginning, since it takes time to successfully end a complicated large-scale program in these years entirely, it takes a lot of time to start rerunning the program. If a large-scale program is not overall successfully ended, it is likely that this large-scale program itself might not be rerun.

SUMMARY

According to an aspect of an embodiment, a computer-readable recording medium stores a program for causing a computer to execute a process. The process includes accepting a second program to be called by a first program, and converting the accepted second program into a program including an initialization instruction to initialize a resource used in association with execution of the second program and a return instruction to return to the first program, as instructions executed when an error occurs.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a functional block diagram of the configuration of an information processing apparatus according to a second embodiment;
FIG. 3 is a diagram of exemplary information stored in a resource table;
FIG. 4 is a diagram of exemplary stack environment values registered by a branch location registering unit.

DESCRIPTION OF EMBODIMENTS

Preferred embodiments of the present invention will be explained with reference to accompanying drawings.
It is noted that the present invention is not limited by these embodiments.

[a] First Embodiment

Figure 1:
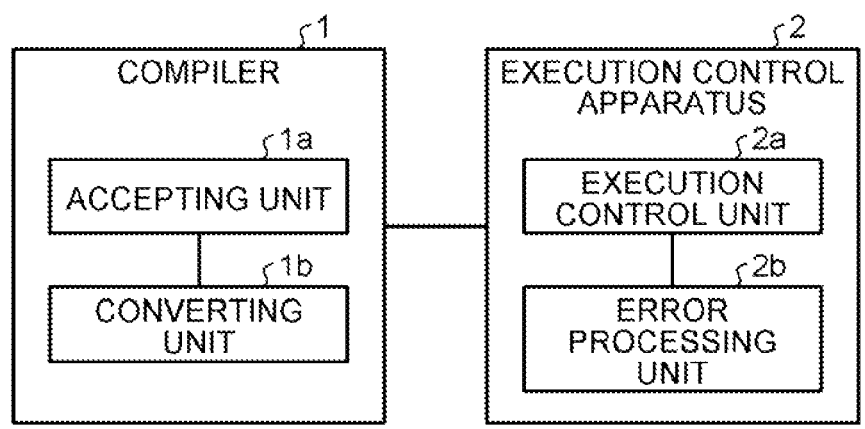
FIG. 1 is a diagram of a compiler and an execution control apparatus according to a first embodiment.

FIG. 1 is a diagram of a compiler and an execution control apparatus according to a first embodiment. Here, the case is depicted where the compiler and the execution control apparatus are separate devices. However, the configuration is not limited thereto. The compiler and the execution control apparatus can also be implemented in a single chassis.

As illustrated in FIG. 1, a compiler 1 is a device including an accepting unit 1a and a converting unit 1b to compile input programs. The accepting unit 1a is a processing unit that accepts a second program which is called by a first program. The converting unit 1b is a processing unit that converts the accepted second program into a program including, as instructions executed if an error occurs, an initialization instruction to initialize resources used in association with the execution of the second program and a return instruction to return to the first program. Here, the initialization instruction is an instruction to initialize resources used in association with the execution of the program. The return instruction is an instruction to return to a caller program that calls the program.

An execution control apparatus 2 is a device including an execution control unit 2a and an error processing unit 2b to execute the compiled program. The execution control unit 2a is a processing unit that executes an execution file in which a program having the instructions additionally written by the compiler 1 is in cooperation with a predetermined function group. The error processing unit 2b is a processing unit that initializes resources based on the initialization instruction described in a program in an execution file having an error if an error occurs and returns to a caller program based on the return instruction described in the program.

As described above, the compiler 1 according to the first embodiment additionally writes the initialization instruction of a resource and the return instruction in a program when compiling. The execution control apparatus 2 can return from a program having an error to a caller program while initializing resources. Accordingly, it is possible to shorten preparation to rerun the program having an error. Moreover, it is possible to rerun the program without fully stopping the program. Consequently, it is possible to shorten time to start rerunning a program having an error.

[b] Second Embodiment

Next, in a second embodiment, an example will be described in which a compiler and an execution control apparatus are implemented in a single chassis. Here, a functional block diagram of an information processing apparatus having the processing units of the compiler and the processing units of the execution control apparatus, a specific example of processing, a process flow, and so on will be described.

Configuration of Information Processing Apparatus

FIG. 2 is a functional block diagram of the configuration of an information processing apparatus according to a second embodiment. As illustrated in FIG. 2, an information processing apparatus 10 according to the second embodiment is a computer having an input/output interface unit 11, a HDD (a hard disk drive) 12, a memory 13, and a processor 14. It is noted that the information processing apparatus 10 may include processing units other than the processing units illustrated in FIG. 2. For example, the information processing apparatus 10 may include an input unit such as a mouse, a display unit such as a display, a storage device such as a hard disk, and so on.

The input/output interface unit 11 is a processing unit that accepts the input of a COBOL program. For example, the input/output interface unit 11 may have a network card or the like to accept the COBOL program via a network. Alternatively, the input/output interface unit 11 may have a storage medium reader to read a COBOL program from an input storage medium.

The HDD 12 is a storage device that stores a source code 12a and an object code 12b therein. The object code 12b is an object code executed by the information processing apparatus 10 and stored by a compiling unit 15.

The memory 13 is a storage device that stores programs executed by the processor 14 and stores an execution file 13a and a stack environment value 13b therein. Moreover, the memory 13 has a resource table 13c and a work area 13d. It is noted that the work area 13d is a temporary area used when the processor 14, the compiling unit 15, a generating unit 16, an execution control unit 17, or the like performs processing.

The execution file 13a is a load module in an executable format in which the object code 12b is in cooperation with appropriate run time or the like stored in a run time system 18, i.e. a COBOL application, and the execution file 13a is stored by the generating unit 16. The stack environment value 13b is a register value or the like registered in the object code by the run time system 18, and the stack environment value 13b is stored by a branch location registering unit 18a.

The resource table 13c is a table that stores resources used by load modules, i.e. the object codes of the COBOL program. FIG. 3 is a diagram of exemplary information stored in a resource table. As illustrated in FIG. 3, the resource table 13c stores file management information in association with data area management information in a run time management area. The run time management area is an area managed by the run time system 18, and the file management information and the data area management information are managed in the run time management area.

The file management information stores "a file name" in association with "a program name". "The file name" stored here is the name of a file used by a program, and "the program name" is the name of the program that uses the file. In the case of FIG. 3, it is indicated that a program "PGMA" uses a file "A. TXT". The data area management information stores "a data area address" in association with "a program name". "The data area address" stored here is the address of data used by a program, and "the program name" is the name of the program that uses data. In the case of FIG. 3, it is indicated that the program "PGMA" uses data stored in an address "0xaaaaaaa".

Now again referring to FIG. 2, the processor 14 is a processing unit that executes an OS (Operating System) or the like and directs the overall processing of the information processing apparatus 10, including the compiling unit 15, the generating unit 16, and the execution control unit 17.

The compiling unit 15 is a processing unit including an input unit 15a and a converting unit 15b to compile the COBOL program. The input unit 15a passes the COBOL program accepted at the input/output interface unit 11 to the converting unit 15b.

The converting unit 15b is a processing unit that converts the input program into an object code additionally including an initialization instruction and a return instruction as instructions executed if an error occurs. For example, the converting unit 15b reads the source code 12a passed from the input unit 15a. The converting unit 15b then additionally writes, in converting the program into an object code, the initialization instruction of a resource and the return instruction as instructions executed by the run time system 18 if an error occurs, and stores the object code in the HDD 12.

The generating unit 16 is a processing unit that couples object codes to generate an execution file in a format executable by the information processing apparatus 10. For example, the generating unit 16 reads and couples the object code 12b stored in the HDD 12 to convert the object code 12b into an executable format. Moreover, the generating unit 16 identifies a function for use in executing the object code for the coupled object codes from a function group managed by the run time system 18. The generating unit 16 then generates a load module in which the object code is in cooperation with the function for the individual object codes. After that, the generating unit 16 stores the load modules generated from the object codes as the execution file 13a in the HDD 12 or the like.

The generating unit 16 may generate an execution file in the case where the generating unit 16 is notified from the compiling unit 15 that compiling is finished, or may generate an execution file at a given timing instructed by an operator or the like.

The execution control unit 17 is a control unit including an executing unit 17a and the run time system 18 to execute the execution file generated by the generating unit 16. The executing unit 17a reads the execution file stored in the HDD 12, and expands the execution file on the memory 13. Namely, the executing unit 17a executes the COBOL program. It is noted that timing at which the executing unit 17a executes the COBOL program is not necessarily continued to timing at which the compiling unit 15 performs compiling.

The run time system 18 has a function group of software modules for use in executing the COBOL program. The run time system 18 includes the branch location registering unit 18a, a resource management unit 18b, a branch processing unit 18c, a resource initialization unit 18d, and a return determining unit 18e. It is noted that these processing units can also be implemented as functions included in the run time system 18.

The branch location registering unit 18a is a processing unit that registers stack environment values in the COBOL program, which is a final return destination. For example, the branch location registering unit 18a is called from a load module where SET PROC is described in an execution file executed by the executing unit 17a. The branch location registering unit 18a then extracts and stores register values, a return address, or the like when executing the caller load module, and stores them in the stack environment value 13b. When finishing the storage of the stack environment value, control is returned to the load module that calls the branch location registering unit 18a.

FIG. 4 is a diagram of exemplary stack environment values registered by the branch location registering unit 18a. As illustrated in FIG. 4, the branch location registering unit 18a registers register values (ebp, esp, esi, and ebx) in association with a return address. "The register values" registered here are register values when calling "SET PROC" in the load module. "The return address" is an address to return to an instruction subsequent to the instruction calling "SET PROC".

The resource management unit 18b is a processing unit that manages resources used in association with the execution of the COBOL program. For example, in the case where an execution file is run, the resource management unit 18b monitors resources used by load modules included in the execution file. When a resource is used, the resource management unit 18b then stores information about the used resource in the resource table 13c.

For an example, in the case where PGMAA, which is a load module in an execution file, uses a file "AAA. TXT", the resource management unit 18b stores "AAA. TXT, PGMAA" in file management information in the resource table 13c. Moreover, in the case where PGMBA, which is a load module in the execution file, updates data of an address "BB", the resource management unit 18b stores "BB, PGMBA" in data area management information in the resource table 13c.

The branch processing unit 18c is a processing unit that starts initializing resources and returning to a caller when detecting an error in executing an execution file. For example, the branch processing unit 18c saves the stack environment values of a load module having an error in the work area 13d. The branch processing unit 18c then makes a request for control to the resource initialization unit 18d.

The resource initialization unit 18d is a processing unit that initializes resources based on the initialization instruction described in the program. For example, the resource initialization unit 18d refers to the resource table 13c, identifies a file opened by a load module, and closes the identified file. Moreover, the resource initialization unit 18d refers to the resource table 13c, identifies data updated by the load module, and refers to the work area 13d or the like to return the data to data before updated.

The return determining unit 18e is a processing unit that returns control to a caller program based on a return instruction described in a program. For example, in the case where a return instruction is described in a load module, the return determining unit 18e identifies a return destination load module based on the execution file 13a or the like. The return determining unit 18e then moves it's control to control over the identified return destination load module, and makes a request for control to the branch processing unit 18c or the resource initialization unit 18d.

Specific Example

Figure 5:
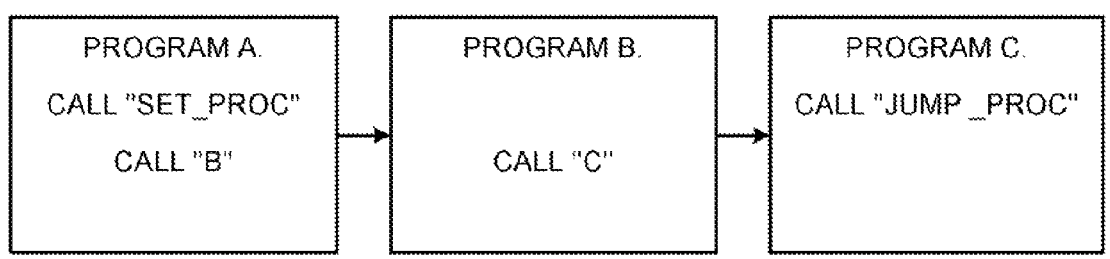
FIG. 5 is a diagram of exemplary programs for execution.
Figure 6:
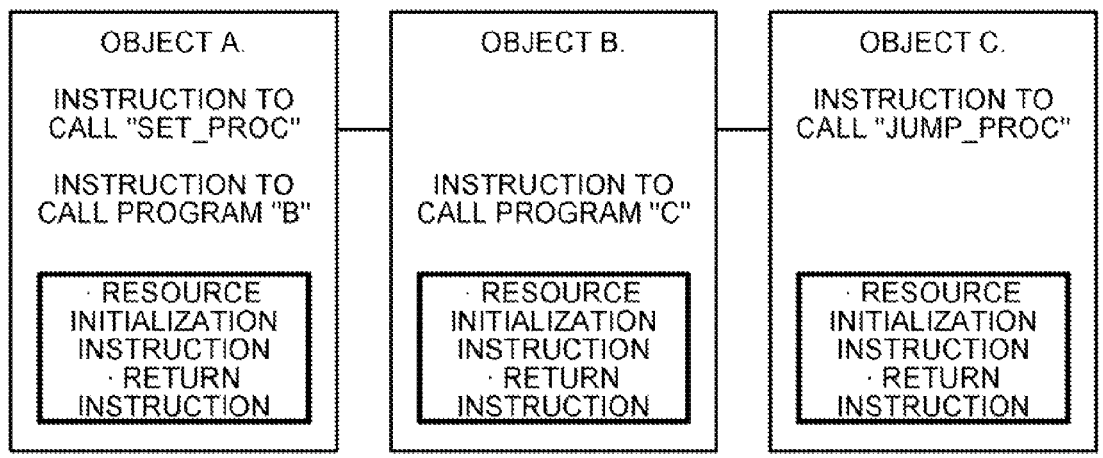
FIG. 6 is a diagram of exemplary object codes after compiled.
Figure 7:
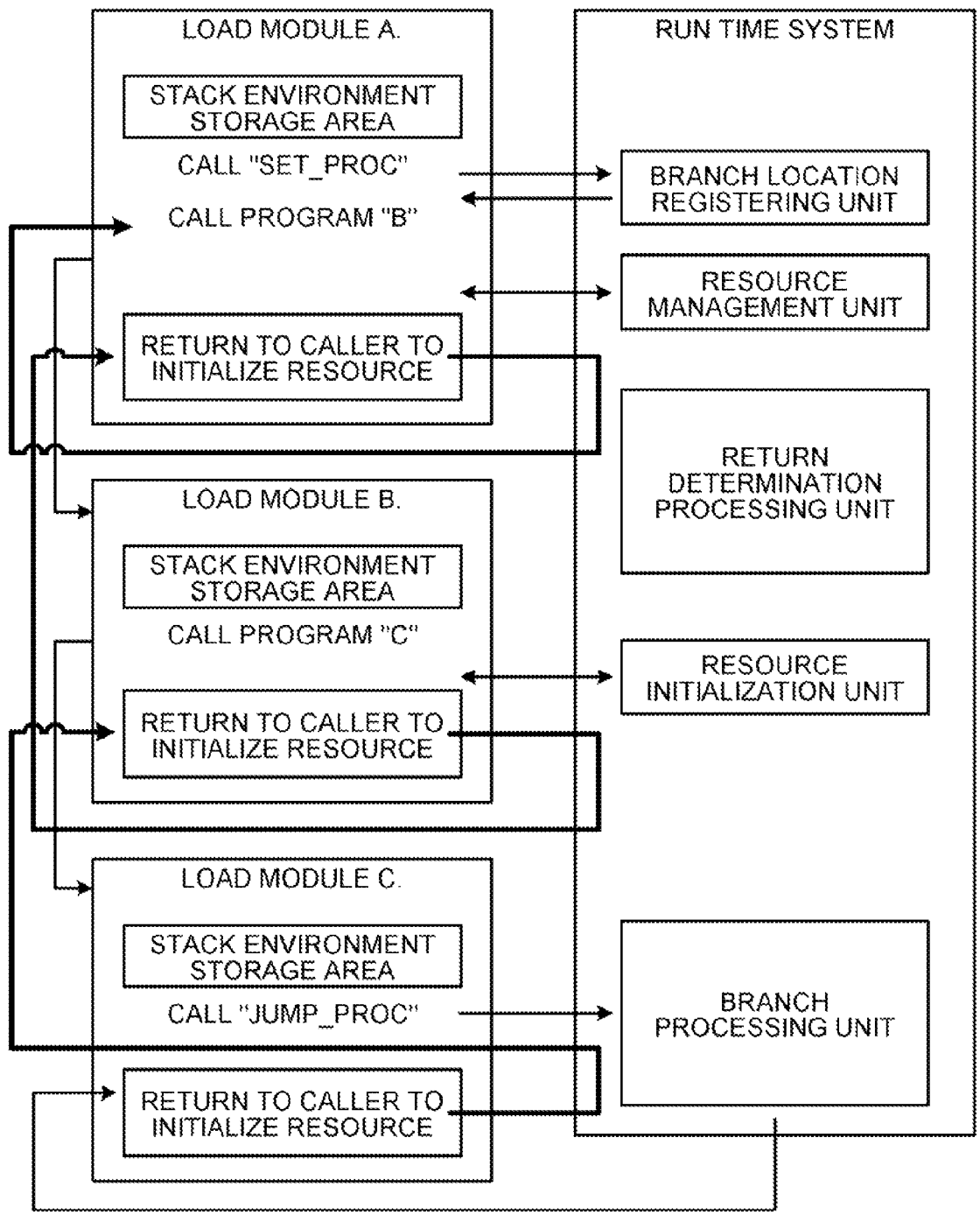
FIG. 7 is a diagram of exemplary program execution.

Next, a specific example will be described with reference to FIGS. 5 to 7. FIG. 5 is a diagram of exemplary programs for execution, FIG. 6 is a diagram of exemplary object codes after compiled, and FIG. 7 is a diagram of exemplary program execution. Here, a COBOL application is taken and described as an example in which a most significant program A calls a subprogram B, and the subprogram B further calls a subprogram C.

As illustrated in FIG. 5, the input unit 15a of the information processing apparatus 10 accepts a COBOL application having a program A, a program B, and a program C, and passes the COBOL application to the converting unit 15b. As illustrated in FIG. 5, CALL "SET_PROC" and CALL "B" are described in the program A. CALL "SET_PROC" is an instruction to call the branch location registering unit 18a, and is information expressing the final return destination. CALL "B" is an instruction to call the program B.

Moreover, CALL "C" is described in the program B. CALL "C" is an instruction to call the program C. CALL "JUMP_PROC" is described in the program C. CALL "JUMP_PROC" is an instruction to call the branch processing unit 18c, and is information expressing the start returning to the final return destination.

Subsequently, the converting unit 15b of the information processing apparatus 10 converts the source code 12a passed from the input unit 15a into the object code 12b, and stores the object code 12b in the HDD 12. For example, the converting unit 15b converts the program A, the program B, and the program C illustrated in FIG. 5 into an object A, an object B, and an object C illustrated in FIG. 6, respectively.

For more specific explanation, the converting unit 15b converts CALL "SET_PROC" in the program A into an instruction to call "SET_PROC", and converts CALL "B" into an instruction to call the program "B". Moreover, the converting unit 15b additionally writes "an initialization instruction" of a resource and "a return instruction" to the object A, which is the conversion of the program A.

Similarly, the converting unit 15b converts CALL "C" in the program B into an instruction to call the program "C". Furthermore, the converting unit 15b additionally writes "an initialization instruction" of a resource and "a return instruction" to the object B, which is the conversion of the program B. Similarly, the converting unit 15b converts CALL "JUMP_PROC" in the program C into an instruction to call "JUMP_PROC". Moreover, the converting unit 15b additionally writes "an initialization instruction" of a resource and "a return instruction" to the object C, which is the conversion of the program C.

After this processing, the generating unit 16 couples the object codes generated by the converting unit 15b to generate a load module having the object codes in cooperation with a run time function, and stores the load module as the execution file 13a in the HDD 12. The executing unit 17a then reads the execution file from the HDD 12, and expands the execution file on the memory 13.

After expansion, as illustrated in FIG. 7, a load module A calls the branch location registering unit 18a in order to register a location to be branched. The branch location registering unit 18a stores the present stack environment in the stack environment value 13b. After storage, the load module A calls the program B. It is noted that the resource management unit 18b manages resource information used by the load module A.

Subsequently, a load module B called by the load module A calls the program C, and a load module C is run. It is noted that the resource management unit 18b manages resource information used by the load module B.

Suppose that an error occurs at timing at which the load module C is being run. The load module C then calls the branch processing unit 18c using the stack environment storage area as an argument in order to make a branch at the location registered in the load module A.

Subsequently, the branch processing unit 18c saves the stack environment value of the load module C passed as the argument in the work area 13d. The resource initialization unit 18d then executes "the initialization instruction" in the load module C, and initializes a resource used by the load module C, in other words, the program C, with reference to the resource table 13c. Subsequently, the return determining unit 18e compares the stack environment value saved by the branch processing unit 18c with the stack environment value registered by the branch location registering unit 18a, and returns control to the caller load module B according to "the return instruction" because the result of the comparison is not matched.

Subsequently, the load module B calls the branch processing unit 18c using the stack environment storage area as an argument in order to make a branch at the location registered in the load module A. The branch processing unit 18c saves the stack environment value of the load module B passed as the argument in the work area 13d. The resource initialization unit 18d then executes "the initialization instruction" in the load module B, and initializes a resource used by the load module B, in other words, the program B, with reference to the resource table 13c. Subsequently, the return determining unit 18e compares the stack environment value saved by the branch processing unit 18c with the stack environment value registered by the branch location registering unit 18a, and returns control to the caller load module A according to "the return instruction" because the result of the comparison is not matched.

Subsequently, the load module A calls the branch processing unit 18c using the stack environment storage area as an argument. The branch processing unit 18c saves the stack environment value of the load module A passed as the argument in the work area 13d. The resource initialization unit 18d then executes "the initialization instruction" in the load module A, and initializes a resource used by the load module A, in other words, the program A, with reference to the resource table 13c. Subsequently, the return determining unit 18e compares the stack environment value saved by the branch processing unit 18c with the stack environment value registered by the branch location registering unit 18a, and determines that the stack environment values are matched with each other. Thus, the return determining unit 18e moves control to a return address registered in the stack environment value. With this processing, it is possible that the information processing apparatus 10 returns the application before executed in a state in which resources are initialized even if an error occurs.

Process Flow

Next, a process flow performed by the information processing apparatus will be described with reference to FIGS. 8 to 10. Here, a process flow in compiling will be described with reference to FIG. 8, a process flow in running a program will be described with reference to FIG. 9, and the process flow of an error process will be described with reference to FIG. 10.

Process Flow in Compiling

Figure 8:
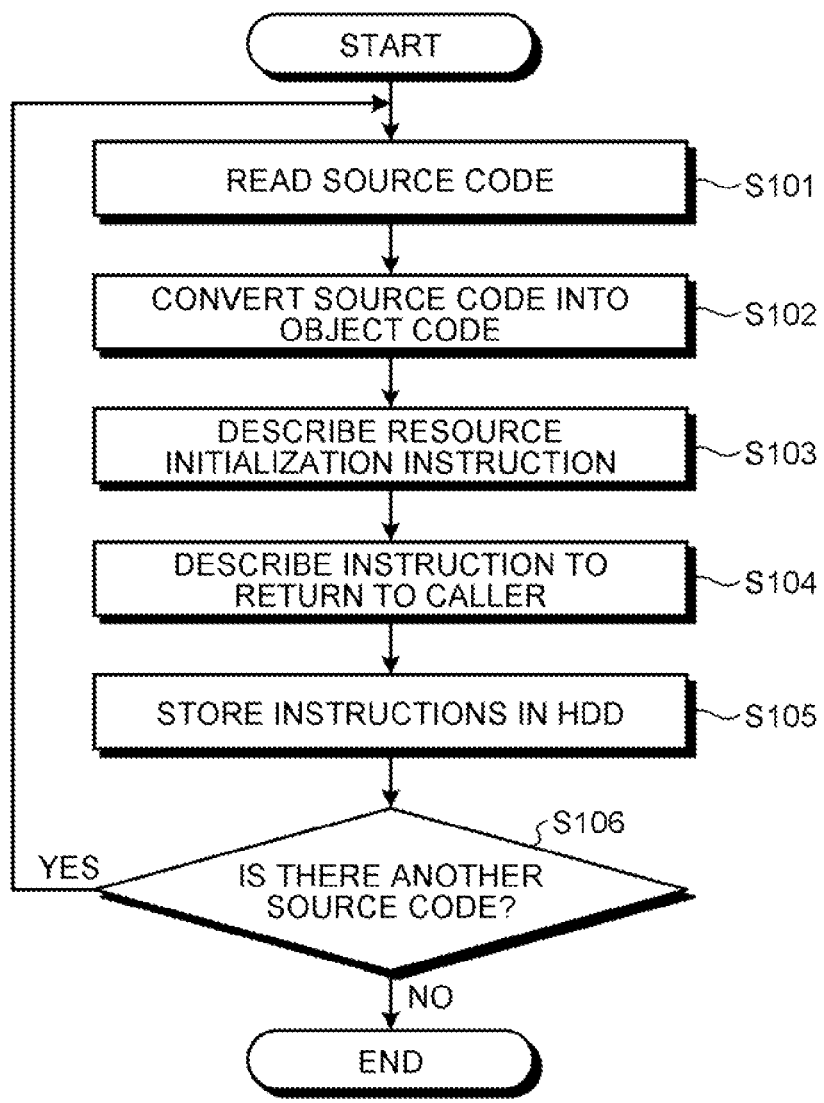
FIG. 8 is a flowchart of a process flow in compiling.

FIG. 8 is a flowchart of a process flow in compiling. As illustrated in FIG. 8, the converting unit 15b of the compiling unit 15 of the information processing apparatus 10 reads a source code passed from the input unit 15a (S101).

Subsequently, the converting unit 15b converts the read source code into an object code (S102). The converting unit 15b then describes "an initialization instruction" of a resource in the converted object code (S103), describes "a return instruction" to a caller (S104), and stores the object code in the HDD 12 (S105).

After storage, if another source code exists in the HDD 12 (Yes in S106), the converting unit 15b returns to S101 and repeats processes after S101. On the other hand, if another source code does not exist in the HDD 12 (No in S106), the converting unit 15b ends the compiling process.

Process Flow in Running Program

Figure 9:
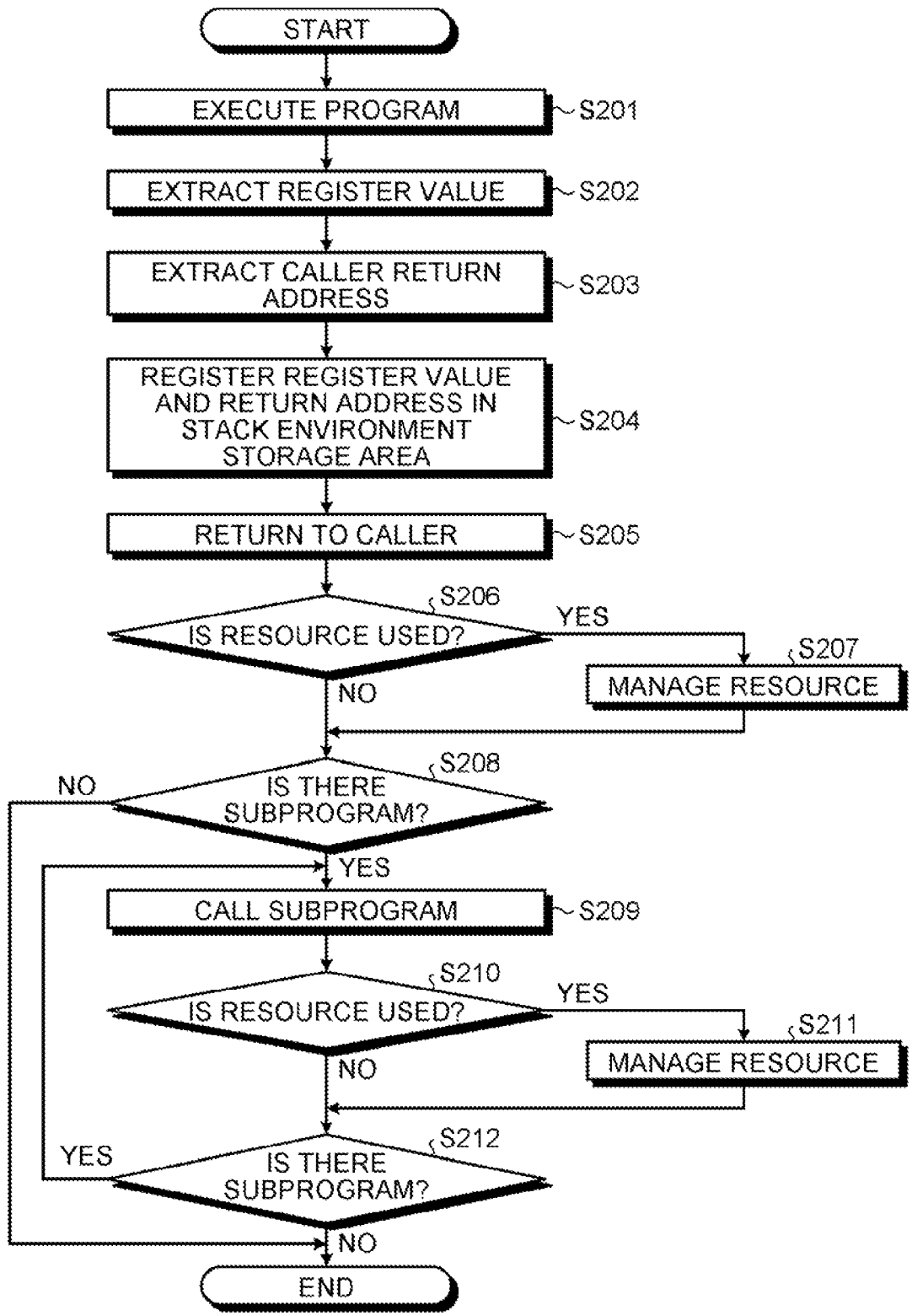
FIG. 9 is a flowchart of a process flow in running a program.

FIG. 9 is a flowchart of a process flow in running a program. As illustrated in FIG. 9, the executing unit 17a of the information processing apparatus 10 expands an execution file generated by the generating unit 16 on the memory 13, and runs the execution file (S201).

Subsequently, the branch location registering unit 18a extracts a register value at a point in time of running the program (S202). Moreover, the branch location registering unit 18a extracts a return address value from a register or the like (S203).

After extraction, the branch location registering unit 18a registers the extracted register value and the extracted return address value in the stack environment value 13b (S204). The branch location registering unit 18a then returns control to a program that calls the branch location registering unit 18a (S205).

In the case where a program uses a resource (Yes in S206), the resource management unit 18b then stores the used resource in association with the program name that uses the resource in the resource table 13c to manage the resource (S207).

Moreover, in the case where a resource is not used (No in S206) or after performing S207, the execution control unit 17 determines whether a call instruction of a subprogram is described in a program where resources are managed (S208).

In the case where a call instruction of a subprogram is described (Yes in S208), the execution control unit 17 then calls the subprogram (S209).

In the case where the called subprogram uses a resource (Yes in S210), the resource management unit 18b then stores the used resource in association with the subprogram name in the resource table 13c to manage the resource (S211).

After storage, in the case where a resource is not used (No in S210) or after performing S211, the execution control unit 17 determines whether a call instruction of a subprogram is further described in the subprogram where the resource is managed (S212). In the case where a call instruction of a subprogram is further described (Yes in S212), the execution control unit 17 then repeats processes after S209.

On the other hand, in the case where a call instruction of a subprogram is not described in the program (No in S208), or in the case where a call instruction of a subprogram is not further described in the subprogram (No in S212), the execution control unit 17 ends the program.

Process Flow of Error Process

Figure 10:
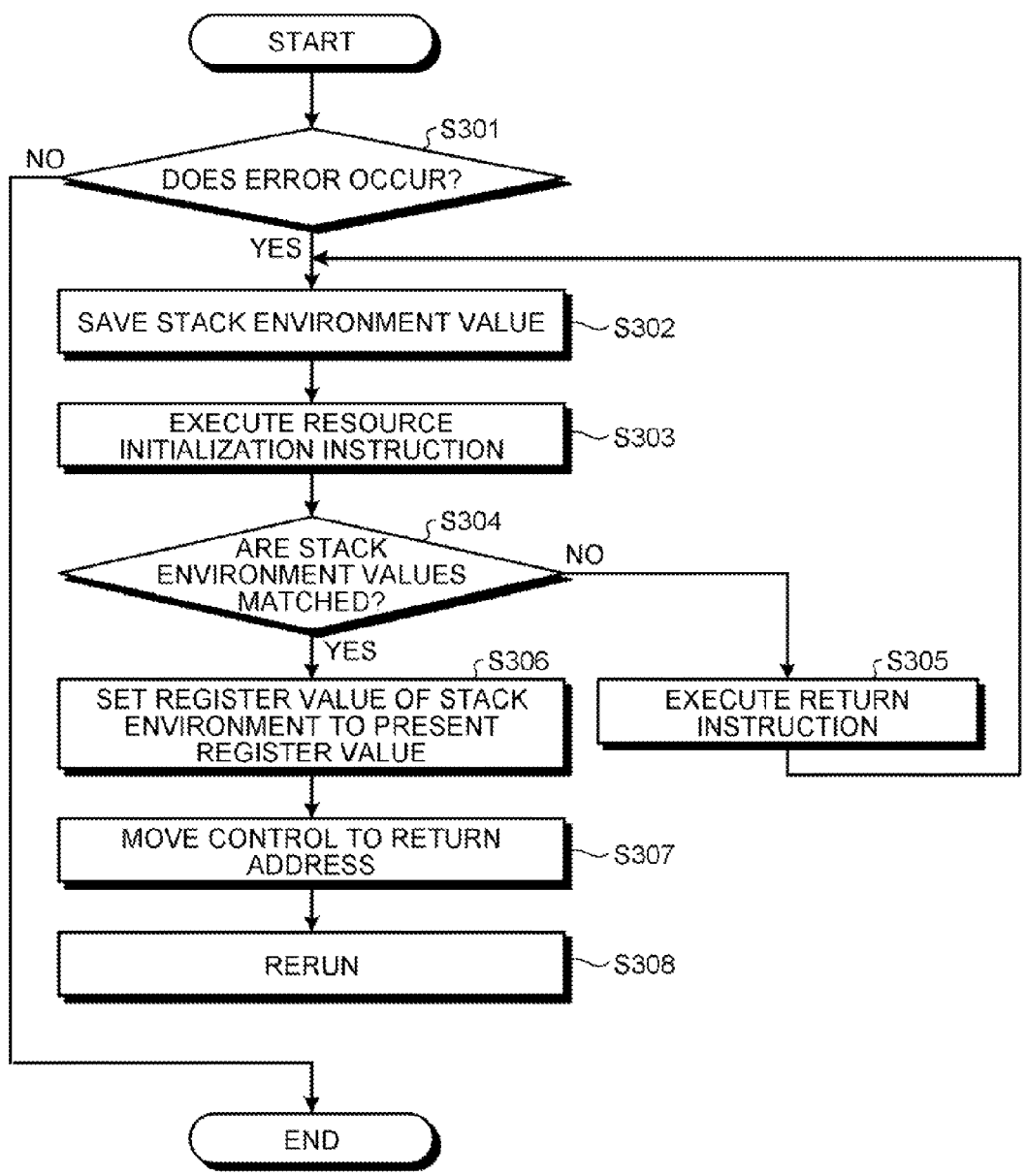
FIG. 10 is a flowchart of a flow of an error process.

FIG. 10 is a flowchart of the flow of an error process. When the execution control unit 17 detects an error (Yes in S301), the branch processing unit 18c saves the stack environment value of a program where an error is detected (S302). It is noted that various methods typically used as methods for detecting an error in programs can be used for the method for detecting an error.

Subsequently, the resource initialization unit 18d executes "the initialization instruction" in the program whose stack environment value is saved (S303). Namely, the resource initialization unit 18d initializes resources with reference to the resource table 13c.

In the case where the saved stack environment value is not matched with the stack environment value registered in the stack environment value 13b by the branch location registering unit 18a (No in S304), the return determining unit 18e returns control to the caller program according to "the return instruction" in the program (S305). After returning, the execution control unit 17 repeats processes after S302.

On the other hand, in the case where the saved stack environment value is matched with the stack environment value registered in the stack environment value 13b by the branch location registering unit 18a (Yes in S304), the return determining unit 18e performs processes after S306. Namely, the return determining unit 18e registers the register value of the stack environment value registered in the stack environment value 13b in an appropriate register as the present register value of the stack environment value of the information processing apparatus 10 (S306). Consequently, the register value can be returned to the register value when "SET PROC" in the program has been run.

The return determining unit 18e then moves control to the return address (S307). After returning, the execution control unit 17 reruns the overall program, that is, the application (S308).

As described above, in compiling the COBOL program, the information processing apparatus 10 can generates the object code in which the initialization instruction and the return instruction are described in the individual programs. Therefore, it is possible that the information processing apparatus 10 returns from the program having an error to the program of the final return destination while initializing resources if an error occurs.

In other words, it is possible that the information processing apparatus 10 returns control to the top program while executing processing in a stage before rerunning the program. Consequently, it is possible to reduce a risk of disabling the program to be rerun because the information processing apparatus 10 is unnecessary to end the overall COBOL program. Moreover, it is possible that the information processing apparatus 10 reruns the COBOL program without performing pre-processing.

[c] Third Embodiment

In the second embodiment, an example is described in which control is returned to the program A of the top of the application. However, the embodiment is not limited thereto. For example, control can also be returned to a given program in an application having a plurality of programs. In this case, it is sufficient that CALL "SET PROC" is described in a program which is desired to be a return destination. Moreover, control may be returned to a previous program, not returned to the top program. Also in this case, similarly, it is sufficient that "an instruction to return to a caller program" is additionally written.

Figure 11:
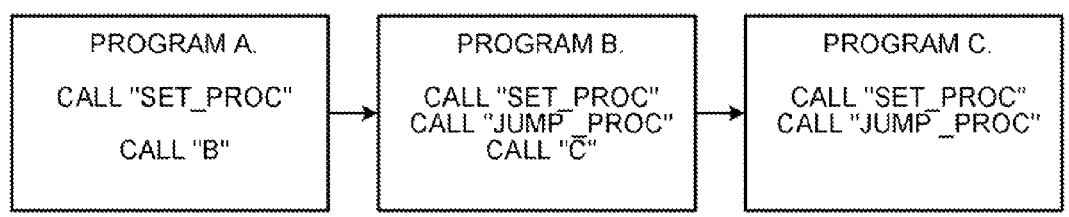
FIG. 11 is a diagram of exemplary programs for execution according to a third embodiment.
Figure 12:
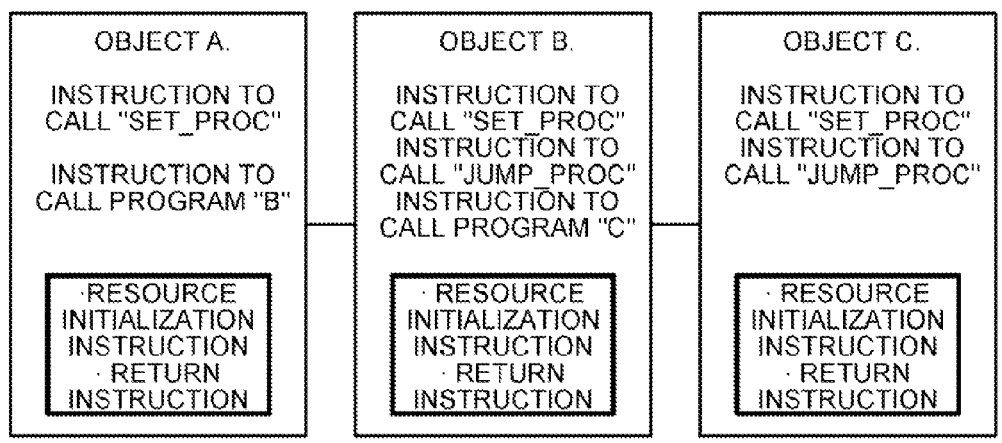
FIG. 12 is a diagram of exemplary object codes after compiled according to the third embodiment.

Here, an example will be described where control is returned to a program previous to a program having an error. FIG. 11 is a diagram of exemplary programs for execution according to a third embodiment. FIG. 12 is a diagram of exemplary object codes after compiled according to the third embodiment.

As illustrated in FIG. 11, an input unit 15a of an information processing apparatus 10 passes a COBOL application having a program A, a program B, and a program C to an converting unit 15b. As illustrated in FIG. 11, CALL "SET_PROC" and CALL "B" are described in the program A.

Moreover, CALL "SET_PROC", CALL "JUMP_PROC", and CALL "C" are described in the program B. Similarly, CALL "SET_PROC" and CALL "JUMP_PROC" are described in the program C.

Subsequently, the converting unit 15b converts a source code 12a passed from the input unit 15a into an object code 12b, and stores the object code 12b in a HDD 12. For example, the converting unit 15b converts the program A, the program B, and the program C illustrated in FIG. 11 into an object A, an object B, and an object C illustrated in FIG. 12, respectively.

For more specific explanation, the converting unit 15b converts CALL "SET_PROC" in the program A into an instruction to call "SET_PROC", and converts CALL "B" into an instruction to call the program "B". Moreover, the converting unit 15b additionally writes "an initialization instruction" of a resource and "a return instruction" to the object A, which is the conversion of the program A.

Similarly, the converting unit 15b converts CALL "SET_PROC" in the program B into an instruction to call "SET_PROC", converts CALL "JUMP_PROC" into an instruction to call "JUMP_PROC", and converts CALL "C" into an instruction to call the program "C". Furthermore, the converting unit 15b additionally writes "an initialization instruction" of a resource and "a return instruction" to the object B, which is the conversion of the program B.

Similarly, the converting unit 15b converts CALL "SET_PROC" in the program C into an instruction to call "SET_PROC", and converts CALL "JUMP_PROC" into an instruction to call "JUMP_PROC". In addition, the converting unit 15b additionally writes "a initialization instruction" of a resource and "a return instruction" to the object C, which is the conversion of the program C.

With this configuration, if an error occurs in a COBOL program, the information processing apparatus 10 can additionally provide an instruction to return to a previous program, that is, a caller. After this processing, programs are executed and an error is processed according to methods similar to the second embodiment.

For brief description, a generating unit 16 couples the object codes illustrated in FIG. 12 to generate an execution file, and an executing unit 17a expands the execution file on a memory 13 and executes the execution file. A branch location registering unit 18a then stores a register value and a return address in the stack environment storage area of an appropriate load module every time when the executing unit 17a executes load modules relevant to the object codes.

For example, when a load module A relevant to the object A is run, the branch location registering unit 18a registers "the address of an instruction to call the program B", which is an instruction subsequent to "SET PROC", in the stack environment storage area in the load module A. In this registration, the branch location registering unit 18a also registers register values as similar in the second embodiment.

Similarly, when a load module B relevant to the object B is run, the branch location registering unit 18a registers the address of an instruction to call "JUMP_PROC", which is an instruction subsequent to "SET PROC", in the stack environment storage area in the load module B. In this registration, as similar in the second embodiment, the branch location registering unit 18a also registers register values.

Moreover, when a load module C relevant to the object C is run, the branch location registering unit 18a registers "the address of an instruction to call JUMP_PROC", which is an instruction subsequent to "SET PROC", in the stack environment storage area in the load module C. In this registration, as similar in the second embodiment, the branch location registering unit 18a also registers register values.

With this configuration, a return destination if an error occurs in the load modules can be specified to a caller program. Consequently, if an error occurs in the load module C, it is possible to return to the instruction to call "JUMP_PROC" in the load module B. Similarly, if an error occurs in the load module B, it is possible to return to "the instruction to call the program B" in the load module A.

[d] Fourth Embodiment

The embodiments of the present invention are described so far. The present invention may be implemented in various different forms other than the forgoing embodiments. Therefore, in the following, different embodiments will be described.

Programs

In the embodiments, COBOL programs are taken and described as an example. However, the embodiments are not limited thereto. Languages may be languages that execute compiling such as the C language.

System

In the processes described in the embodiments, all of or a part of the processes that are described as automatically performed may be manually performed. Alternatively, all of or a part of the processes that are described as manually performed may be automatically performed by methods commonly known. In addition to this, the process procedures, control procedures, specific names, and information including various items of data and parameters described above and illustrated in the drawings can be freely modified and altered unless otherwise specified.

Moreover, the components of the devices illustrated in the drawings are functional concepts, which are not necessarily configured as illustrated in the drawings physically. Namely, the specific forms of the distribution and integration of the devices are not limited to ones illustrated in the drawings. In other words, all of or a part of the devices can be configured in the functional or physical distribution and integration in given units according to various loads or use situations, for example. Furthermore, all of or a given part of process functionalities performed in the devices are implemented by the CPU and programs analyzed and executed by the CPU, or can be implemented as hardware in wired logic.

Hardware Configuration

Various processes described in the foregoing embodiments can be implemented by executing programs prepared beforehand on a computer system such as a personal computer and a workstation. Therefore, in the following, an exemplary computer system that executes programs having functionalities similar in the foregoing embodiments will be described.

Figure 13:
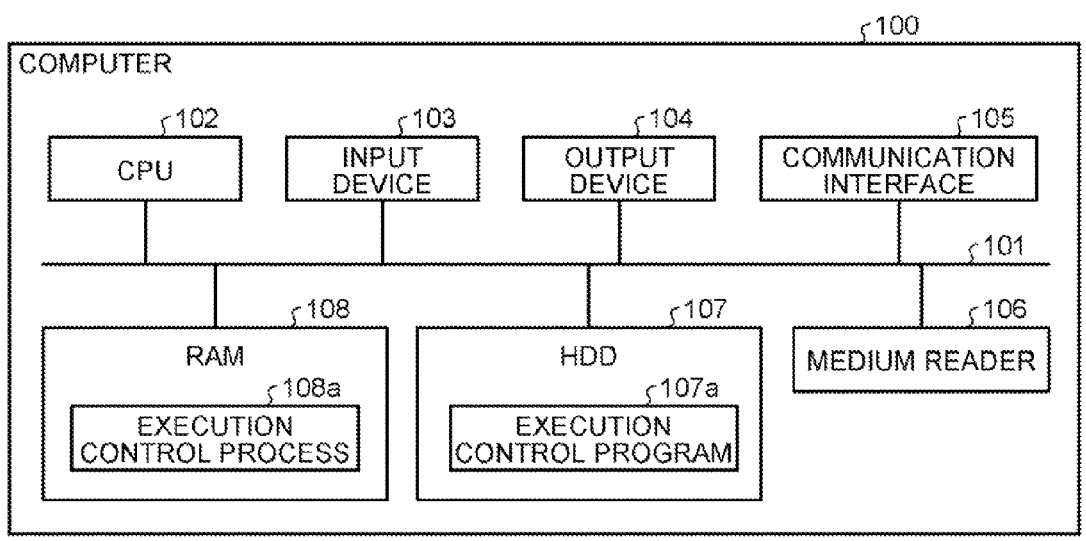
FIG. 13 is a diagram of an exemplary hardware configuration of a computer to run an execution control program.

FIG. 13 is a diagram of an exemplary hardware configuration of a computer to run an execution control program. As illustrated in FIG. 13, a computer 100 includes a CPU 102, an input device 103, an output device 104, a communication interface 105, a medium reader 106, a HDD (Hard Disk Drive) 107, and a RAM (Random Access Memory) 108. Moreover, the components illustrated in FIG. 13 are connected to each other through a bus 101.

The input device 103 is a mouse and a keyboard. The output device 104 is a display or the like. The communication interface 105 is an interface such as a NIC (Network Interface Card). The HDD 107 stores an execution control program 107a and the items of information or the like illustrated in FIG. 2 therein. The HDD 107 is taken as an example of a storage medium. However, such a configuration may be possible in which various programs are stored in a computer-readable storage medium such as a ROM (Read Only Memory), a RAM, and a CD-ROM and a computer reads these various programs. It is noted that such a configuration may be possible in which a storage medium is disposed at a remote site and a computer makes access to the storage medium to acquire and use programs on the storage medium. Moreover, in this processing, the acquired programs may be stored in the storage medium of the computer for use.

The CPU 102 reads and expands the execution control program 107a on the RAM 108 to operate an execution control process 108a to execute the functionalities described by referring to FIG. 2 and other drawings. Namely, the execution control process 108a performs the functionalities similar to the compiling unit 15 and the execution control unit 17 illustrated in FIG. 2. As described above, the computer 100 operates as an information processing apparatus that executes the execution control method by reading and executing programs.

For example, the computer 100 may implement the functionalities similar in the foregoing embodiments in which the medium reader 106 reads the execution control program out of the storage medium to execute the read execution control program. It is noted that the program described here is not limited to programs executed by the computer 100. For example, the present invention can be similarly applied in the case where a different computer or server executes the program, or in the case where a different computer and a different server execute the program in cooperation with each other.

It is possible to suppress time to start rerunning a program having an error.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process comprising:

inputting a second program that is called by a first program; and converting the second program into a converted second program including an instruction that is executed when an error occurs, the instruction including an initialization instruction and a return instruction, wherein the initialization instruction initializes a resource used in association with execution of the second program and the return instruction instructs return to the first program.

2. The non-transitory computer-readable recording medium according to claim 1, wherein the process further comprising:

executing an execution file having the converted second program generated in the converting in cooperation with a predetermined function group; and when an error occurs, initializing the resource based on the initialization instruction described in the execution file having the error, and returning to a caller program based on the return instruction described in the execution file.

3. The non-transitory computer-readable recording medium according to claim 1, wherein the process further comprising:

executing an execution file having the converted second program generated in the converting in cooperation with a predetermined function group;

registering a stack environment value in a specified program when the specified program is run, the specified program being specified as a final return destination in the executed execution file;

when an error occurs, initializing the resource based on the initialization instruction described in the converted second program in the execution file having the error, and when the stack environment value is not registered in the converted second program, returning to a caller program based on the return instruction described in the converted second program;

when the stack environment value is not registered in the caller program, executing the initialization instruction and the return instruction; and when the stack environment value is registered in the caller program, executing the initialization instruction and moving control to a return address identified by the stack environment value.

4. A compiler comprising:

a memory; and a processor coupled to the memory, wherein the processor executes a process comprising:

inputting a second program that is called by a first program; and converting the second program into a converted second program including an instruction that is executed when an error occurs, the instruction including an initialization instruction and a return instruction, wherein the initialization instruction initializes a resource used in association with execution of the second program and the return instruction instructs return to the first program.

5. An executions control apparatus comprising:

a memory; and a processor coupled to the memory, wherein the processor executes a process comprising:

inputting a second program that is called by a first program;

converting the second program into a converted second program including an instruction that is executed when an error occurs, the instruction including an initialization instruction and a return instruction, wherein the initialization instruction initializes a resource used in association with execution of the second program and the return instruction instructs return to the first program;

executing an execution file having the converted second program in cooperation with a predetermined function group; and when an error occurs, initializing the resource based on the initialization instruction described in the converted second program in the execution file having the error, and returning to a caller program based on the return instruction described in the converted second program.

6. An execution control method comprising:

inputting a second program that is called by a first program;

converting, using a processor, the second program into a converted second program including an instruction that is executed when an error occurs, the instruction including an initialization instruction and a return instruction, wherein the initialization instruction initializes a resource used in association with execution of the second program and the return instruction instructs return to the first program;

executing, using the processor, an execution file having the converted second program in cooperation with a predetermined function group; and when an error occurs, initializing, using the processor, the resource based on the initialization instruction described in the converted second program in the execution file having the error, and returning to a caller program based on the return instruction described in the converted second program.

* * * * *